United States Patent Office 3,414,584
Patented Dec. 3, 1968

3,414,584
SILICON- AND NITROGEN-CONTAINING FOUR-MEMBERED RING COMPOUNDS AND PROCESS FOR PREPARING
Walter Fink, Zurich, Switzerland, assignor to Monsanto Company, St. Louis, Mo., a corporation of Delaware
No Drawing. Continuation-in-part of application Ser. No. 210,245, July 16, 1962. This application Dec. 12, 1966, Ser. No. 600,781
Claims priority, application Switzerland, July 17, 1961, 8,344/61
The portion of the term of the patent subsequent to Jan. 18, 1983, has been disclaimed
19 Claims. (Cl. 260—326)

ABSTRACT OF THE DISCLOSURE

Silicon- and nitrogen-containing four-membered ring compounds of the formula

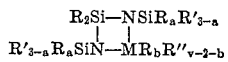

and a process for making them by reacting an organotrisilazane compound of the formula $R'_{3-a}R_aSiNHSi(R)_2NHSiR_aR'_{3-a}$ with a Grignard derivative or the organotrisilane in the form of an alkali salt with an equimolar quantity of a halide of the formula $X_nMR_{v-n}$ wherein X is a halogen atom, $n$ is at least 2, $v$ is the valence of M and M is selected from the class consisting of silicon, boron and phosphorus.

---

This application is a continuation-in-part of application Ser. No. 210,245, filed July 16, 1962, now abandoned. The present invention relates to silicon- and nitrogen-containing four-membered ring compounds which have the general formula

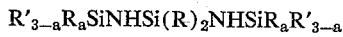

wherein the symbols have the following significance: M is silicon, boron, phosphorus or a metal which is at least bivalent; the R groups are like or unlike, possibly fluorinated, hydrocarbon radicals and/or radicals of an alcohol or phenol; R' is a radical of a mercaptan, a secondary amine, or groups such as —OBR$_2$, —OSnR$_3$, or —OSiR$_3$, phthalimido or dialkylamino having not more than 24 carbon atoms; R" is chlorine, fluorine, or the group

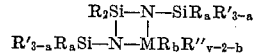

which possesses at its end the same four-membered ring as shown above; $a$ is 2 or 3; $b$ is zero or an integer not greater than $v-2$; $v$ is the valence of M which can also be part of another identical four-membered ring, instead of having attached radicals R and R". Normally R and R' each will have not more than 24 carbon atoms and usually not more than 8 carbon atoms.

In the preparation of the new substituted four-membered rings, an organotri-silazane in the form of an alkali salt or Grignard derivative is reacted with a silicon, boron, phosphorus or metal halide. The organotrisilazanes which serves as starting material can have, for example, the following formula:

$R_3Si—NH—Si(R_2)—NH—SiR_3$

The preparation of 1,5-hexamethyl-3-dimethyl-2,4-bis-(trimethylsilyl)-trisilazane has been reported in the literature (U. Wannagat, H. Niederprum, Z. anorg. allg. Chem., 308, 337 [1961]).

After the hexaorganodisilazane has bene prepared from triorganosilicon chloride and ammonia, and the lithium salt has been prepared by using butyllithium, the following reaction steps lead to the octaorgano-trisilazane:

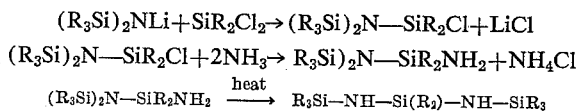

It has been found that other starting compounds in which the R's are other hydrocarbon radicals than methyl and/or in which the R's are radicals of an alcohol or phenol, can be prepared, in principle, the same way.

Organotrisilazanes corresponding to the formula

wherein R and R' have the significance given above, have not been known previously. It has been found that by heating a cyclic, preferably trimeric, organosilazane with twice the molar quantity of a hydroxyl compound, a mercaptan or a secondary amine, the corresponding substituted trisilazanes are formed, having the above formula. This reaction can be carried out with or without a solvent. In general, one heats the reaction mixture to about 80–140° C., but, if need be, one can work at higher temperatures. The end of the reaction is shown by the end of ammonia evolution. Hydroxyl compounds are useful in the preparation of such substituted trisilazanes as, for example, alcohols, phenols, HOBR$_2$, HOSnR$_3$, HOSiR$_3$ and the like. The reaction proceeds with, for example hexaorganocyclosilazane and a triorganosilanol according to the following scheme:

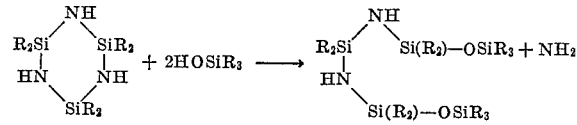

These trisilazanes are subsequently converted in known manner to the respective dialkali salt or Grignard compound, by using, for example, potassium or sodium in the presence of styrene, or by using butyl- or phenyl-lithium, or Grignard agents.

In the preparation of substituted four-memebered rings according to the invention, these trisilazanes are reacted with a halide of silicon, phosphorus, boron or of a metal which contains at least two reactive halogen atoms.

Suitable halides are such as MgCl$_2$, ZnCl$_2$, BCl$_3$, AlCl$_3$, SiCl$_4$, SnCl$_4$, PCl$_3$, etc. Aside from the two halogen atoms necessary in the reaction, organic substituents, especially hydrocarbon radicals, fluorinated hydrocarbon radicals such as —CF$_3$, —CH$_2$CF$_3$, —CF$_2$CF$_3$, —C$_6$F$_5$, etc. and/or alkoxyls, aroxyls, etc. can be present. Examples are CH$_3$SiCl$_3$, (CH$_3$)$_2$SiCl$_2$, CH$_3$OSiCl$_3$, (CH$_3$O)$_2$SiCl$_2$, (CH$_3$)CH$_3$OSiCl$_2$ etc. It is clear that fluorides, bromides, iodides and compounds of other acids such as sulfates, nitrates, acetates, etc. can also be used, in addition to the chlorides. From the technical point of view, however, the easily accessible and cheaper chlorides are preferred.

This second reaction component used in the reaction is illustrated by the general formula $X_nMR_{v-n}$, where M and R again have the same significance as before, X is the residue of an acid, preferably a halogen atom, $n$ is at least 2 and $v$ represents the valency of M.

The principle of formation of four-membered rings may be illustrated as follows:

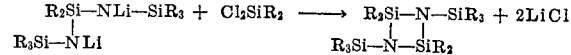

Depending on whether a halide of the formula

$X_3MR_{v-3}$ or $X_4M$, is used, compounds can be obtained which possess one (I) or two four-membered rings, and if two rings they can be linked through the element M to form a spirane (II) or linked through a trisilazane group (III):

$$\underset{(I)}{\square\text{M}-\text{R}_{v-2}} \quad \underset{(II)}{\square\text{M}-\square\text{M}} \quad \underset{(III)}{\overset{\text{SiR}_2}{\underset{\text{R}_{v-3}}{\square\text{M}-\text{N}-\text{Si}(\text{R}_2)-\text{N}-\text{M}\square}}}$$

It is preferred in carrying out the process, that the halide be added with exclusion of moisture, to the alkali salt or Grignard derivative of the trisilazane and be heated to about 80–150° C. Higher or lower reaction temperatures can be employed if it seems necessary. The reaction can be conducted in presence or absence of a solvent. Anhydrous toluene, benzene, xylene, etc. are used for convenience. The reaction product can in some cases be isolated by distillation in vacuum, preferably after separation of the by-product alkali or magnesium salts. On occasion, it may be sufficient in the purification to eliminate the salts by washing with water.

In order to get substituted four-membered rings which still contain on the atom or atom grouping M at least one halogen atom, a trisilazane is reacted with, for example, an at least equimolar amount of a tri- or tetrahalide. The trisilazane which is in the form of an alkali salt or a Grignard derivative is conveniently added at higher temperatures to, preferably an excess of the halide, and/or such halides are used whose halogen atoms display a varied reactivity as, for example in $SiCl_2F_2$, $SiBr_2Cl_2$, $CH_3SiCl_2F$, $C_6H_5SiBr_2Cl$, etc.

The products resulting from the process are liquid or solid, depending on the organo groups which are present. They can be used as heat exchange liquids at high temperatures, lubricants for hot highly stressed machine parts, hydraulic fluids, textile agents, anti-foamants, antioxidants, stabilizers, accelerators in vulcanization, plasticizers, hydrophobing agents, flameproofing agents, absorbers for neutrons, active ingredients of insecticides, bactericides, fungicides and other pesticides. The novel compounds are valuable intermediates for the manufacture of high temperature resistant polymers.

It has been found by investigating cyclic, tetrameric, trimeric and dimeric N-silylsubstituted silazanes, that the four-membered rings, i.e. the latter, possess by far the greatest temperature resistance. To the extent that replaceable halogen atoms attached to silicon are available, these compounds can be converted by treating with water, or alkali solution, to the corresponding organosilanols, or to their dimeric or polymeric condensation products. Depending on whether one or two halogen atoms which can be hydrolyzed are available, one of the following compounds will be obtained:

$$\underset{\text{R}}{\overset{\square}{\text{Si}-\text{OH}}} \qquad \underset{\text{R}\quad\text{R}}{\overset{\square\quad\square}{\text{Si}-\text{O}-\text{Si}}}$$

$$\left[\overset{\square}{\underset{\text{l}}{\text{Si}-\text{O}-}}\right]_p \quad (p=\text{degree of polymerization})$$

EXAMPLE 1

Preparation of the dilithium salt of octamethyltrisilazane $(CH_3)_3SiNLiSi(CH_3)_2NLiSi(CH_3)_3$.

To a solution of 24.4 g. (0.118 mole) of octamethyltrisilazane in 50 ml. of anhydrous n-hexane are added gradually with stirring under nitrogen 15.18 g. (0.237 mole) of butyllithium in 145 ml. n-hexane. After the addition is complete, stirring at 20–25° C. is continued for 1½ hours. The n-hexane is distilled off in vacuum and the residue is fractionated.

Yield: 21.1 g. (=82%); M.P. 60–70° C.; B.P. 172° C./2 mm.

Analysis.—$C_8H_{24}N_2Si_3Li_2$: Calc. percent: C, 39.00; H, 10.52; N, 11.4. Found: C, 39.90; H, 9.72; N, 11.1.

EXAMPLE 2

Preparation of $[(CH_3)_3Si-N-Si(CH_3)_2]_2$ 22.1 g. (0.089 mole) of the dilithium salt (obtained as in Example 1) are dissolved in 70 ml. of o-xylene and to this solution is added with stirring and excluding moisture a solution of 11.55 g. (0.089 mole) of $(CH_3)_2SiCl_2$ in 30 ml. of o-xylene. The mixture is heated at 144° C. (B.P. of o-xylene) for 8 hours. 7.5 g. of lithium chloride are separated from the reaction mixture, and this corresponds to an exchange of 98.8%. The o-xylene is distilled off at normal pressure and the residue is fractionated.

forerun, 70–89° C./11 mm., 2.3 g.
main fraction, 89–90° C./11 mm., 21.2 g. (=81%)
residue (resin), 2.1 g.

The new four-membered ring compound can be sublimated at temperatures of about 30° C.; B.P. 85° C./7 mm.; M.P. 38–39° C.; density 0.998.

Analysis.—$C_{10}H_{20}N_2Si_4$: Calc. percent: C, 41.31; H, 10.40; N, 9.41. Found: C, 41.70; H, 10.48; N, 9.57.

Molecular weight: calculated 290.72, found (by X-ray method) 294.3.

Infrared spectrum: 2965 v.s., 2900 m., 1435 m., 1403 m., 1350 st., 1313 m., 1255 v.s., 1032 m. (!), 907 v.s., 855 v.s., 785 st.

EXAMPLE 3

Preparation of $$\underset{(C_2H_5)CH_3Si-NSi(CH_3)_3}{(CH_3)_3SiN-SiCH_3(C_2H_5)}$$

47.0 g. (0.18 mole) of the dilithium salt $$Me_3Si-N(Li)-Si(Me)(Et)-N(Li)-SiMe_3$$

prepared as in Example 1 are dissolved in 100 ml. of xylene (mixture of isomeric compounds) and to this solution is added with stirring and excluding moisture a solution of 25.8 g. (0.18 mole) of $Me(Et)SiCl_2$ in 20 ml. of xylene. The mixture is heated in an autoclave at 150–60° C. for 6 hours. 15.4 g. of lithium chloride are formed, corresponding to a conversion of 99%. The xylene is distilled off at normal pressure and the residue is fractionated.

Yield: 37.3 g. (=65%); B.P. 74° C./0.9 mm.; $n_D^{20}$ 1.4502.

Analysis.—$C_{12}H_{34}N_2Si_4$: Calc., percent: C, 45.23; H, 10.74; N, 8.79; Si, 35.24. Found, percent: C, 45.43; H, 10.46; N, 8.80; Si, 36.22.

Molecular weight: calculated 318.7, found (by cryoscopic method in benzene) 333.

EXAMPLE 4

Preparation of $$\underset{(CH_3)_2Si-NSi(CH_3)_3}{(CH_3)_3SiN-Si(OC_2H_5)_2}$$

24.6 g. (0.1 mole) of the dilithium salt of Example 1 are dissolved in 50 ml. of xylene (mixture of isomeric compounds) and to this solution is added with stirring and excluding moisture a solution of 19.0 g. (0.1 mole) of $(EtO)_2SiCl_2$ in 20 ml. of xylene at 0° C. The mixture is heated at 144° C. and refluxed for 7 hours. 8.5 g. of lithium chloride are formed, corresponding to a conversion of 100%. The xylene is distilled off at normal pressure and the residue is fractionated.

Yield: 16.8 g. (=47.8%); B.P. 79.5° C./1.5 mm.; $n_D^{20}$ 1.4312.

Analysis.—$C_{12}H_{34}O_2N_2Si_4$: Calc., percent: C, 40.97; H, 10.03; N, 7.96; Si 31.94. Found, percent: C, 40.57; H, 9.87; N, 7.85; Si 32.50.

Molecular weight: calculated 351.7, found (by cryoscopic method in benzene) 336.

EXAMPLE 5

Preparation of $$\begin{array}{c} (CH_3)_3SiN\text{---}SiCl_2 \\ | \quad | \\ (CH_3)_2Si\text{---}NSi(CH_3)_3 \end{array}$$

31.1 g. (0.12 mole) of the dilithium salt of Example 1 are dissolved in 50 ml. of xylene (mixture of isomeric compounds) and to this solution is added with stirring and excluding moisture a solution of 21.4 g. (0.12 mole) of $SiCl_4$ in 50 ml. of xylene. The mixture is heated in an autoclave at 150° C. for 7 hours. 9.3 g. of lithium chloride are formed, corresponding to a conversion of 87%. The xylene is distilled off and the residue is fractionated.

Yield: 28.8 g. (=72.3%); B.P. 118° C./21 mm.; M.P. 28–29° C.

Analysis.—$C_8H_{24}N_2Cl_2Si_4$: Calc., percent: C, 28.97; H, 7.29; N, 8.45; Cl, 21.39. Found, percent: C, 28.61; H, 7.32; N, 8.35; Cl, 22.09.

Molecular weight: calculated 331.6, found (by cryoscopic method in benzene) 326.

EXAMPLE 6

Preparation of $$\begin{array}{c} (CH_3)_3SiN\text{---}BC_6H_4 \\ | \quad | \\ (CH_3)_2Si\text{---}NSi(CH_3)_3 \end{array}$$

24.6 g. (0.1 mole) of the dilithium salt of Example 1 are dissolved in 50 ml. of n-hexane and to this solution is added with stirring and excluding moisture a solution of 15.9 g. (0.1 mole) of $PhBCl_2$ in 100 ml. of n-hexane at 0° C. The mixture is heated at 68° C for 3 hours. 8.1 g. of lithium chloride are formed, corresponding to a conversion of 95%. The n-hexane is distilled off and the residue is fractionated.

Yield: 17.6 g. (=55%); B.P. 90–91° C./1.2 mm.; M.P. 20–22° C.; $n_D^{20}$ 1.4783.

Analysis.—$C_{14}H_{29}N_2BSi_3$: Calc., percent: C, 52.46; H, 9.12; N, 8.74; B, 3.38; Si, 26.29. Found, percent: C, 52.45; H, 9.10; N, 8.58; B, 3.60; Si, 26.27.

Molecular weight: calculated 320.4, found (by ebullioscopic method in diethyl ether) 335.

EXAMPLE 7

Preparation of $$\begin{array}{c} (CH_3)_3SiN\text{---}PC_6H_5 \\ | \quad | \\ (CH_3)_2Si\text{---}NSi(CH_3)_3 \end{array}$$

17.2 g. (0.07 mole) of the dilithium salt of Example 1 are dissolved in 100 ml. of n-hexane and to this solution is added with stirring and excluding moisture a solution of 12.4 g. (0.07 mole) of $PhPCl_2$ in 50 ml. of n-hexane at 0° C. The mixture is left standing at 30° C. for 1 hour. 5.4 g. of lithium chloride are formed, corresponding to a conversion of 91%. The n-hexane is distilled off and the residue is fractionated.

Yield: 10.4 g. (=43.5%); B.P. 107° C./4 mm.; $n_D^{20}$ 1.5029.

Analysis.—$C_{14}H_{29}N_2Si_3P$: Calc., percent: C, 49.36; H, 8.58; N, 8.22; Si, 24.74; P, 9.09. Found, percent: C, 49.86; H, 8.86; N, 7.46; Si, 24.67; P, 9.02.

Molecular weight: calculated 340.6, found (by cryoscopic method in benzene) 347.

EXAMPLE 8

Preparation of an organosilazoxane of the formula $$(CH_3)_3Si\text{---}O\text{---}Si\text{---}(CH_3)_2\text{---}NH\text{---}Si(CH_3)_2\text{---}NH\text{---}Si(CH_3)_2\text{---}O\text{---}Si(CH_3)_3$$

Hexamethyl-cyclo-trisilazane $[(CH_3)_2Si\text{---}NH]_3$ and trimethylsilanol $(CH_3)_3SiOH$ in molar ratio of 1:2 are heated at 140° C. for 2 hours. Based on the ammonia evolved, there has been 100% reaction. The product can be distilled in vacuum.

Colorless liquid: B.P. 116–116:5° C./8 mm.

Analysis.—$C_{12}H_{36}O_2N_2Si_5$: Percent N: calc., 7.31; found, 7.3. Mol. weight: calc., 382.9; found, 418.

The lithium salt of the trisilazane of this example is made in a similar manner to the making of the lithium salt of Example 1. By reacting the lithium salt in a similar manner with the same organic silicon halides as used in the foregoing examples, the corresponding four-membered ring compounds are obtained.

EXAMPLE 9

To 26.66 g. (0.2 mole) of ethylmagnesiumbromide are added dropwise 23.11 g. (0.1 mole) of $$(CH_3)_3SiNH\text{---}Si(CH_3)_2\text{---}NHSi(CH_3)_3$$

in 20 ml. of ether. To the suspension of the bis-(Grignard) derivative are slowly added 35.2 g. (0.4 mole) of dioxane and after 3 hours stirring the magnesium bromide adduct with dioxane is filtered off. The filtrate is freed from the solvent in vacuum and the white crystalline product is purified by sublimation. Sublimation point is 80–100° C./0.5 mm. This product is a four-membered ring compound of the formula $$\begin{array}{c} (CH_3)_3Si\text{---}N\text{---}Si(CH_3)_3 \\ | \quad | \\ (CH_3)_2Si\text{---}N\text{---}Mg \end{array}$$

and in its crystalline form it contains 1 mole of dioxane.

Analysis.—$C_{12}H_{32}O_2N_2Si_3Mg$ (344.99): Calc., percent: C, 41.77; H, 9.35; N, 8.12; Mg. 7.04. Found, percent: C, 42.17; H, 9.30; N, 8.44; Mg. 6.93.

By using the procedures described in the Examples 1 to 5, the following cyclodisilazanes (1,3,2,4-diazadisiletidines) have been obtained:

EXAMPLE 10

1,3-bis-(trimethyl-silyl)-2,2,4,4-tetraethyl-1,3,2,4-diazadisiletidine 80–82° C./0.9 mm.

EXAMPLE 11

1,3-bis-(methyldiphenylsiloxy-dimethyl-silyl)-2,2,4,4-tetramethyl-1,3,2,4-diazadisiletidine, B.P. 226° C./0.01 mm.; $n_D^{20}$ 1.5338.

EXAMPLE 12

1,3-bis-(triphenylsiloxy-dimethyl-silyl)-2,2,4,4-tetramethyl-1,3,2,4-diazadisiletidine, M.P. 189° C.

EXAMPLE 13

1,3-bis-(m-toloxy-dimethyl-silyl)-2,2,4,4-tetramethyl-1,3,2,4-diazadisiletidine, B.P. 168° C./0.01 mm; $n_D^{20}$ 1.5101.

EXAMPLE 14

1,3-bis-(diethylamino-dimethyl-silyl)-2,2,4,4-tetramethyl-1,3,2,4-diazadisiletidine 127° C./0.5 mm.; $n_D^{20}$ 1.4577.

EXAMPLE 15

1,3-bis-(trimethylsiloxy-dimethyl-silyl)-2,2,4,4-tetramethyl-1,3,2,4-diazadisiletidine, B.P. 105° C./1.0 mm.; $n_D^{20}$ 1.4227.

EXAMPLE 16

1,3-bis-(dimethyl-phthalimido-silyl)-2,2,4,4-tetramethyl-1,3,2,4-diazadisiletidine, M.P. 149° C.

EXAMPLE 17

1,3-bis-(triphenyl-silyl)-2,2,4,4-tetraphenyl-1,3,2,4-diazadisiletidine, M.P. 424° C.

EXAMPLE 18

1,3-bis-(tri-n-butyl-silyl)-2,2,4,4-tetraphenyl-1,3,2,4-diazadisiletidine, M.P. 112° C., B.P. 165° C./0.1 mm.

EXAMPLE 19

1-trimethyl-silyl-3-methyl-diphenyl-silyl - 2,2,4,4 - tetramethyl-1,3,2,4-diazadisiletidine 204° C./11 mm.

EXAMPLE 20

1,3-bis-(trimethyl-silyl)-2,2-dimethyl-4,4 - diphenyl - 1, 3,2,4-diazadisiletidine 120° C./0.03 mm.

EXAMPLE 21

1,3-bis-(dimethyl-phenyl-silyl)-2,2,4,4 - tetramethyl - 1, 3,2,4-diazadisiletidine, B.P. 133° C./0.03 mm.

What is claimed is:

1. A process for preparing silicon- and nitrogen-containing four-membered ring compounds of the formula

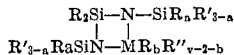

wherein the symbols have the following significance: M is selected from the class consisting of silicon, boron, phosphorus and magnesium; R taken singly is selected from the class consisting of hydrocarbon, fluorinated hydrocarbon, alkoxy and aryloxy radicals having not more than 24 carbon atoms; R' is —OSiR₃, phthalimido or dialkylamino having not more than 24 carbon atoms; R'' taken singly is selected from the class consisting of chlorine, fluorine,

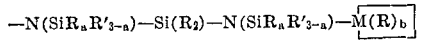

which possesses at its end the same four-membered ring as shown hereinabove; and when R and R'' are taken together with M to which they are attached a second silicon- and nitrogen-containing four-membered ring the same as the one described hereinabove is formed; $a$ is an integer from 2 to 3; $b$ is an integer of from 0 to $v-2$; $v$ is the valence of M; comprising reacting an organotrisilazane compound of the formula $$R'_{3-a}R_aSiNHSi—(R)_2NHSiR_aR'_{3-a}$$

wherein the symbols have the same significance as hereinabove with a Grignard derivative or the organotrisilane in the form of an alkali salt with an equimolar quantity of a halide of the formula $X_nM'R_{v'-n}$ wherein X is halogen atom, $n$ is at least 2, $v'$ is the valence of M' and M' is selected from the class consisting of silicon, boron and phosphorus.

2. A process of claim 1 wherein an inert solvent is used.

3. A process of claim 1 wherein X is the chlorine atom.

4. A silicon- and nitrogen-containing four-membered ring compound of the formula

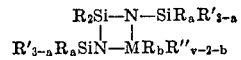

wherein the symbols have the following significance: M is selected from the class consisting of silicon, boron, phosphorus and magnesium; R taken singly is selected from the class consisting of hydrocarbon, fluorinated hydrocarbon, alkoxy and aryloxy radicals having not more than 24 carbon atoms; R' is —OSiR₃, phthalimido or dialkylamino having not more than 24 carbon atoms; R'' taken singly is selected from the class consisting of chlorine, fluorine,

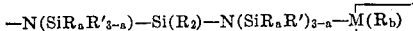

which possesses at its end the same four-membered ring as shown hereinabove; and when R and R'' are taken together with M to which they are attached a second silicon- and nitrogen-containing four-membered ring the same as the one described hereinabove is formed; $a$ is an integer from 2 to 3; $b$ is an integer of from 0 to $v-2$; $v$ is the valence of M.

5. A compound of claim 4 wherein M is a silicon atom, $b$ is 2, R is an alkyl radical having not more than 8 carbon atoms, and $a$ is 3.

6. A compound of claim 4 wherein M is a silicon atom, the R attached to M is an alkoxy radical having not more than 8 carbon atoms, $b$ is 2, the other R groups are alkyl having not more than 8 carbon atoms, and $a$ is 3.

7. A compound of claim 4 wherein M is a silicon atom, R'' is a chlorine atom, $b$ is 0, R is an alkyl radical having not more than 8 carbon atoms, and $a$ is 3.

8. A compound of claim 4 wherein M is a boron atom, the R attached to M is a phenyl radical, $b$ is 1, the other R groups are alkyl radicals having not more than 8 carbon atoms, and $a$ is 3.

9. A compound of claim 4 wherein M is a phosphorus atom, R attached to M is a phenyl radical, $b$ is 1, $v-2-b$ is 0, the other R groups are alkyl having not more than 8 carbon atoms, and $a$ is 3.

10. A compound of claim 4 wherein M is the magnesium atom, $b$ is 0, $v$ is 2, R is alkyl having not more than 8 carbon atoms, and $a$ is 3.

11. A compound of claim 4 wherein M is a silicon atom, R is a hydrocarbyl radical having not more than 24 carbon atoms, R' is a trihydrocarbylsiloxy radical having not more than 24 carbon atoms, $a$ is 2 and $b$ is 2.

12. A compound of claim 4 wherein M is a silicon atom, R is an alkyl radical having not more than 24 carbon atoms, R' is a dialkylamino radical having not more than 16 carbon atoms, $a$ is 2 and $b$ is 2.

13. A compound of claim 5 having the formula

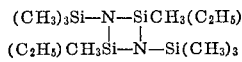

14. A compound of claim 6 having the formula

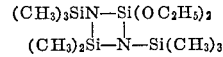

15. A compound of claim 7 having the formula

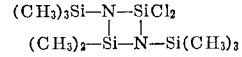

16. A compound of claim 8 having the formula

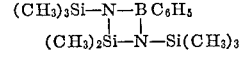

17. A compound of claim 9 having the formula

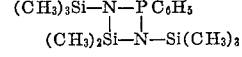

18. A compound of claim 10 of the formula

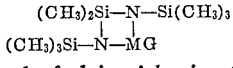

19. A compound of claim 4 having the formula

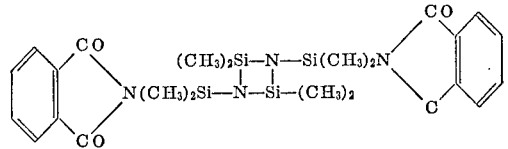

References Cited

UNITED STATES PATENTS 3,230,242  1/1966  Fink _____ 260—448.2

TOBIAS E. LEVOW, *Primary Examiner.*

J. P. PODGORSKI, *Assistant Examiner.*